Figure 1:
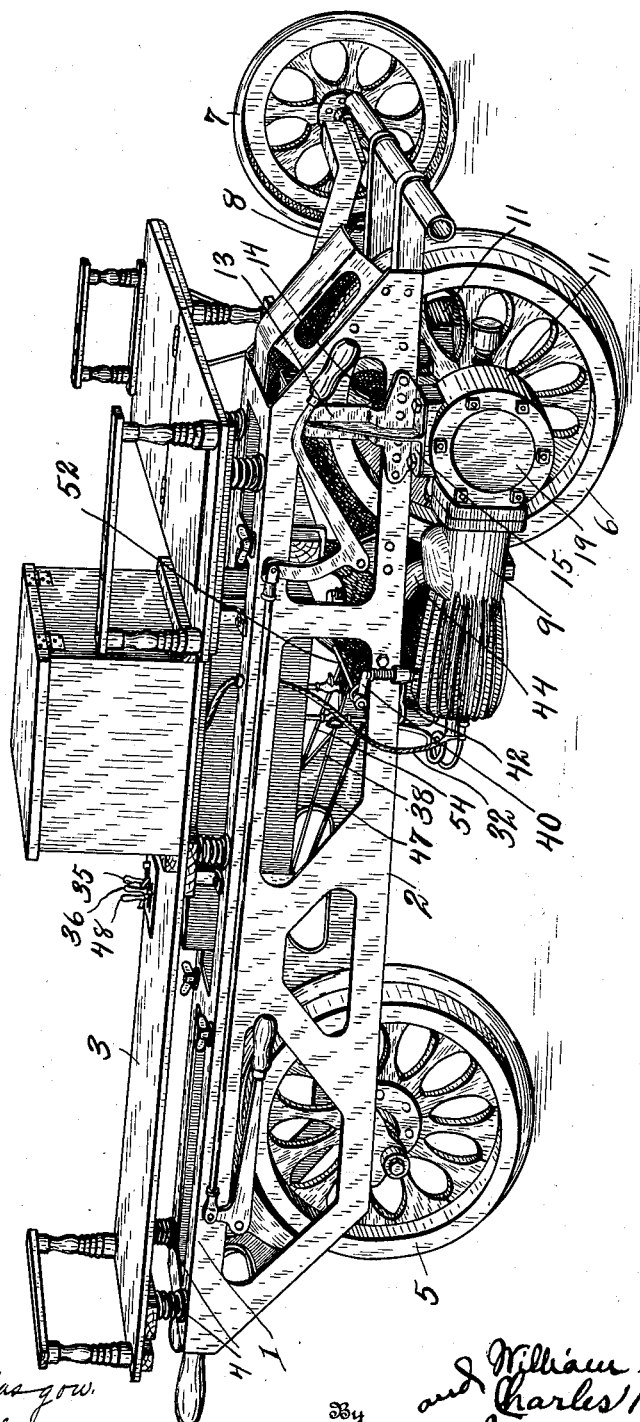

W. S. HOVEY & C. B. STEBBINS.
MOTOR CAR.
APPLICATION FILED JAN. 30, 1911.

1,009,519.

Patented Nov. 21, 1911.
3 SHEETS—SHEET 1.

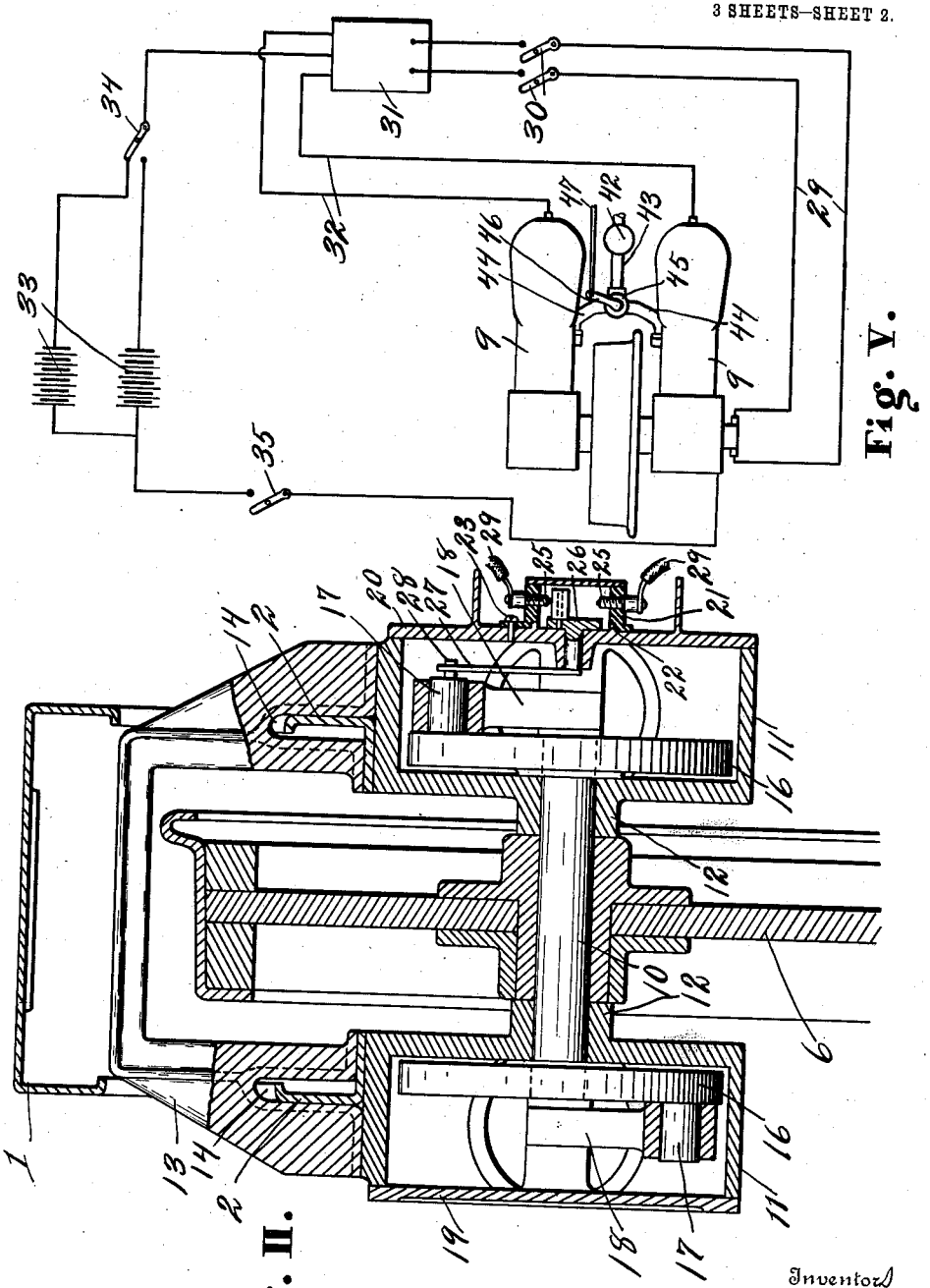

W. S. HOVEY & C. B. STEBBINS.
MOTOR CAR.
APPLICATION FILED JAN. 30, 1911.
1,009,519.
Patented Nov. 21, 1911.
3 SHEETS—SHEET 3.
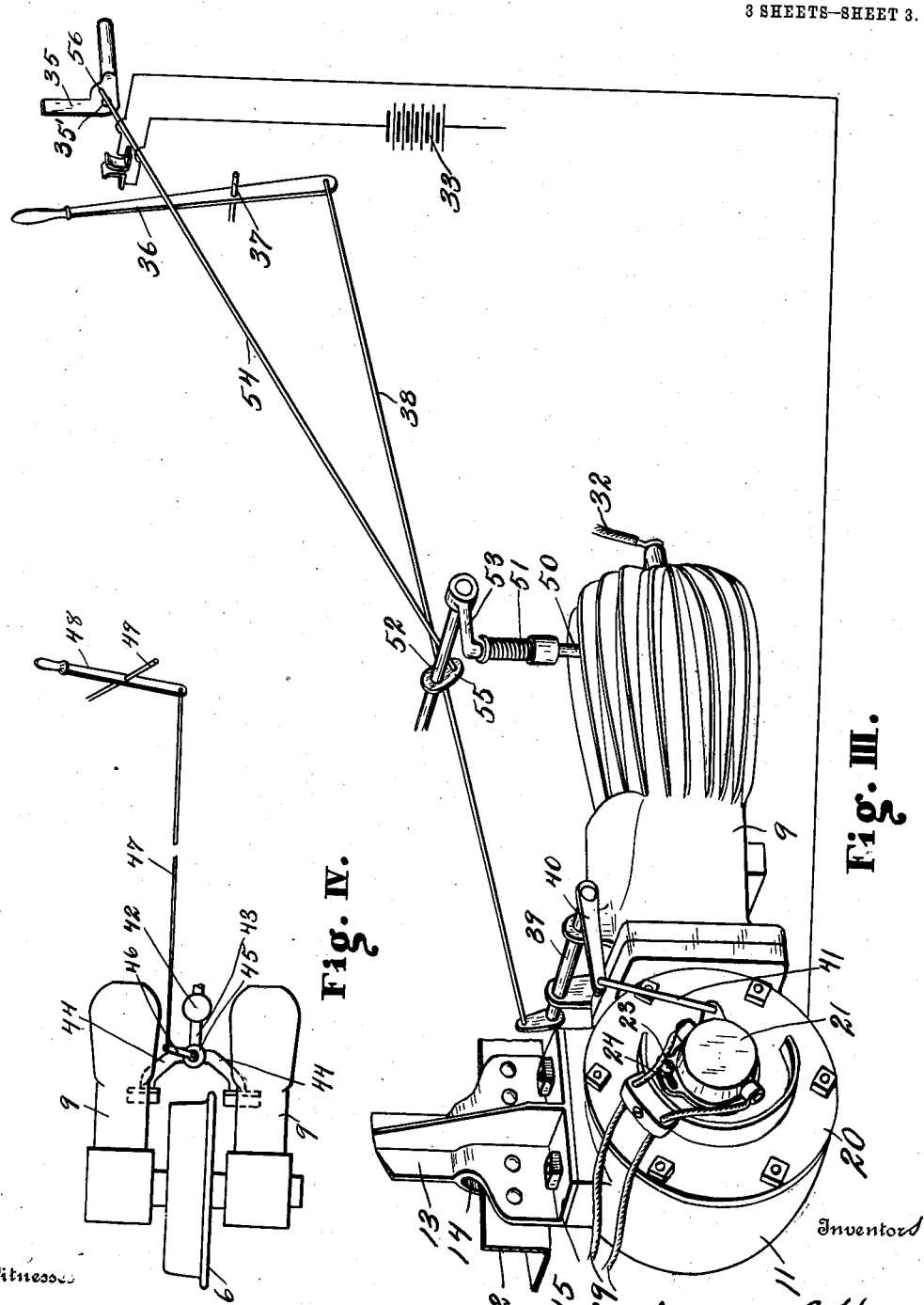

UNITED STATES PATENT OFFICE.

WILLIAM S. HOVEY AND CHARLES B. STEBBINS, OF THREE RIVERS, MICHIGAN, ASSIGNORS TO SHEFFIELD CAR COMPANY, OF THREE RIVERS, MICHIGAN.

MOTOR-CAR.

1,009,519.  Specification of Letters Patent.  Patented Nov. 21, 1911.

Application filed January 30, 1911. Serial No. 605,543.

*To all whom it may concern:*

Be it known that we, WILLIAM S. HOVEY and CHARLES B. STEBBINS, citizens of the United States, residing at the city of Three Rivers, county of St. Joseph, State of Michigan, have invented certain new and useful Improvements in Motor-Cars, of which the following is a specification.

This invention relates to improvements in motor cars.

Our improvements are particularly adapted by us for use on railway motor cars of the type shown in our application for Letters Patent filed March 7th, 1910, Ser. No. 547,910, and are, in some particulars, modifications and improvements upon the structure there illustrated. Certain features are, however, very readily adapted for and desirable for use in other relations.

The main objects of this invention are: First, to provide in a motor car an improved arrangement and mounting of the engines. Second, to provide an improved motor car in which the axle of the traction wheel is adapted to serve as a crank shaft for the engine. Third, to provide an improved motor car in which the engines are mounted directly upon the axle. Fourth, to provide an improved motor car having a pair of engines in which either or both of the engines may be cut out of operation.

Further objects, and objects relating to structural details, will definitely appear from the detailed description to follow.

We accomplish the objects of our invention by the devices and means described in the following specification.

The invention is clearly defined and pointed out in the claims.

A structure, which is a preferred embodiment of our invention, is clearly illustrated in the accompanying drawing, forming a part of this specification, in which:

Figure I is a perspective view of a structure embodying the features of our invention. Fig. II is an enlarged detail vertical transverse section through the traction wheel and crank casings, the traction wheel axle, which is adapted as engine crank shaft, and certain other parts being shown in full lines. Fig. III is a detail perspective view of the engine on the inner side of the car, showing the arrangement of the timer, the timer adjusting lever and connections therefor to the timer, the main or battery switch, and connections therefor to the compression relief valve of the engine. Fig. IV is a detail view, mainly in conventional form, showing the relation of the engines and the three-way control valve thereof. Fig. V is a diagrammatic view of the engines and traction wheel and of the electrical connections.

In the drawing, similar reference characters refer to similar parts throughout the several views.

Referring to the drawing, the frame or body of the car illustrated is substantially that shown in our application for Letters Patent referred to, in which the top longitudinal sills 1 and the bottom longitudinal sills 2 and their connecting cross pieces are formed integrally of sheet or plate metal. The platform-like seat 3 is carried by springs. As the seat structure forms no part of this invention, it is not further described herein.

The structure illustrated has a pair of main wheels 5 and 6, and an auxiliary or third wheel 7. The third wheel is carried by a bar 8. The main part of the load is carried by the wheels 5 and 6, which are arranged within the frame between the bottom sills thereof. The engines 9 are of the two-cycle type and are arranged one at each side of the traction wheel 6. The engines 9 are provided with a common crank shaft 10, which is adapted as the axle of the traction wheel 6. A crank shaft casing 11 is provided for each engine, the casings having bearings 12 on their inner ends for the crank shaft 10. The engines 9 are mounted upon these crank shaft casings. The car frame is also mounted upon the crank shaft casings. The casings are further connected and supported in relation to each other and the frame braced by means of the yoke 13, which is arranged over the traction wheel, the arms of the yoke being slotted at 14 to receive the vertical arms of the angled bottom sills. The ends of the arms of the yoke are provided with angled feet 15, which are secured to the casings and to the bottom sills.

The crank shaft or axle 10 is provided with crank disks 16 at each end, having crank pins 17 thereon for the piston rods 18. These crank pins are oppositely disposed. That is, they are set at 180° from each other. This rigid connecting yoke for the crank shaft casings preserves the alinement of the cylinders and prevents excessive wear on the bearings, which might result from distortion of the car frame were the engines mounted directly upon the car frame or connected to each other only through the frame. By thus mounting the engines, their proper relation is maintained and the strain and wear upon the bearings is minimized.

The casings are provided with side plates 19 and 20, the side plate 20 being the side plate of the inner crank shaft casing. On the side plate 20 we mount a timer consisting of an adjustable contact carrying member 21, which is mounted on a flange-like support 22 on the side of the plate, the member 21 being retained in position by the screw 23 arranged through the slot 24 therein. (See Fig. III). A pair of contacts 25 are carried by the member 21, while a co-acting contact member 26 is rotatably mounted on the side plate 20.

The member 26 has a crank arm 27, which is connected by the pin 28 to the crank pin 17 of the crank shaft. The timer members 25 are connected by the wires 29 and switches 30 to the spark coil 31, see Fig. V, where the parts are diagrammatically illustrated. The coil is connected to the spark plugs of the engines by means of the wires 32, and to the batteries 33 through the switch 34. The batteries are connected to the bodies of the engines through a main control switch.

The member 21 is adjusted through the lever 36, which is pivoted at 37 and connected by the link 38 to the rock shaft 39. This rock shaft is provided with an arm 40, which is connected by the link 41 to the timer member 21. The carbureter 42 is arranged between the engines and connected by a pipe 43 having branches or arms 44 to the cylinders. The delivery pipe 43 is controlled by the three-way valve 45. The details of this valve will be readily understood and are not, therefore, illustrated herein. The stem of this valve is provided with an arm 46, which is connected by the link 47 to the lever 48 mounted on the pivot rod 49 and arranged through the seat 3, as shown.

The cylinders are provided with relief valves 50, having springs 51 on their stems adapted to hold them normally closed. Details of these valves are not illustrated, as they will be readily understood. These valves are opened by means of a rock shaft 52, having arms 53 thereon engaging the stems of the valves, see Fig. III, the rock shaft being connected by the link 54, which is connected to an arm 55 on the rock shaft and to the switch 35.

The switch 35 is pivoted at 35', as shown diagrammatically in Fig. III, and the pivot 56 for the link to the lever is arranged so that it swings past the center, thus locking the valve open. When the switch is closed, the springs 51 close the relief valves. When these valves are open, the compression is relieved in the cylinders, so that the car can be pushed easily along the track. This is of considerable advantage in the structure illustrated, where the crank shaft forms the axle for the traction wheel, as no means for connecting or disconnecting the engines can be interposed.

By providing the means for cutting out either of the engines, one of them can be cut out of use when operating conditions do not require the power of both engines, or should one of the engines become disabled, it can be cut out.

Our improved motor car is simple in structure and the parts are so arranged that they are not likely to be damaged or injured in use. The engines are so arranged and supported that their alinement is maintained, and the consequent wear on the bearing parts reduced to a minimum.

We have illustrated and described our improvements in the form in which we have embodied them in practice. We are aware, however, that considerable variations in structural details are possible, but as such variations or modifications will no doubt be obvious to those skilled in the art to which this invention relates, we have not attempted to illustrate or describe the same in detail herein.

Having thus described our invention, what we claim as new and desire to secure by Letters Patent is:

1. In a motor car, the combination with a frame comprising angled bottom sills arranged with their angles outwardly and downwardly; of a traction wheel arranged between said sills; a pair of engines; a crank shaft adapted as an axle for said wheel having a crank disk at each end, the crank pins being oppositely disposed on said disks; crank shaft casings having bearings for said crank shaft formed integrally therewith, the engine cylinders being mounted on said casings, said sills being arranged on said casings; and a yoke-like connecting bracket for said casings arranged over said wheel, the arms of said bracket being slotted to receive the vertical arms of said bottom sills and being provided with angled feet secured to said casings and to said sills.

2. In a motor car, the combination with a frame comprising longitudinal sills; of a traction wheel arranged between said sills; a pair of engines; a crank shaft adapted as an axle for said wheel having a crank disk at each end, the crank pins being oppositely disposed on said disks; crank shaft casings having bearings for said crank shaft formed integrally therewith, the engine cylinders being mounted on said casings, said sills being arranged on said casings; and a yoke-like connecting bracket for said casings arranged over said wheel, and secured to said casings and to said sills.

3. In a motor car, the combination with a frame comprising longitudinal sills: of a traction wheel arranged between said sills; a pair of engines; a crank shaft adapted as an axle for said wheel having a crank disk at each end, the crank pins being oppositely disposed on said disks; and crank shaft casings having bearings for said crank shaft formed integrally therewith, the engine cylinders being mounted on said casings, said sills being arranged on said casings.

4. In a motor car, the combination with a frame comprising bottom sills; of a traction wheel arranged between said sills; a pair of engines; a common crank shaft for said engines adapted as an axle for said wheel; crank shaft casings having bearings for said crank shaft thereon, the engine cylinders being mounted on said casings, said sills being arranged on said casings; and a yoke-like connecting bracket for said casings arranged over said wheel, the arms of said bracket being slotted to receive said sills and being secured to said casings and to said sills.

5. In a motor car, the combination with a frame comprising longitudinal sills; of a traction wheel arranged between said sills; a pair of engines; a common crank shaft for said engines adapted as an axle for said wheel; crank shaft casings having bearings for said crank shaft thereon, the engine cylinders and sills being mounted on said casings; and a yoke-like connecting bracket for said casings arranged over said wheel and secured to said casings and to said sills and constituting a frame member.

6. In a motor car, the combination with a frame comprising longitudinal sills; of a traction wheel arranged between said sills; a pair of engines; a common crank shaft for said engines adapted as an axle for said wheel; and crank shaft casings having bearings for said crank shaft thereon, the engine cylinders and sills being mounted on said casings.

7. In a motor car, the combination with a frame; of a traction wheel; a pair of engines; a common crank shaft for said engines adapted as an axle for said wheel; crank shaft casings having bearings for said crank shaft thereon, the engine cylinders and frame being mounted on said casings; and a connecting bracket for said casings constituting a frame member.

8. In a motor car, the combination with a frame; of a traction wheel; a pair of engines; a common crank shaft for said engines adapted as an axle for said wheel; and crank shaft casings having bearings for said crank shaft thereon, the engine cylinders and frame being mounted on said casings.

9. In a motor car, the combination with the car body; of a traction wheel; a pair of engines; a common crank shaft for said engines adapted as an axle for said wheel; crank shaft casings having bearings for said crank shaft thereon mounted on said body and a connecting bracket for said crank shaft casings.

10. In a motor car, the combination with a car body; a traction wheel; a pair of engines; a common crank shaft therefor adapted as an axle for said traction wheel; and crank casings on which the engine cylinders are mounted arranged one at each side of said traction wheel and having bearings thereon for said crank shaft, the body being mounted on said casings.

11. In a motor car, the combination with the car body, of a traction wheel; a pair of engines; a common crank shaft therefor adapted as an axle for said traction wheel; and crank shaft casings arranged one at each side of said traction wheel having bearings thereon for said crank shaft, said engine cylinders being mounted on said crank shaft casings.

12. A railway motor car, the combination with the car body; of a traction wheel arranged between said sills; a pair of engines; a crank shaft adapted as an axle for said wheel having a crank disk at each end; crank shaft casings having bearings for said crank shaft thereon; side plates for said casings; a timer comprising a contact carrying member adjustably mounted on the side plate for the inner casing in axial alinement with the crank shaft; a rotary contact member; a bearing therefor on said side plate, arranged in axial alinement with said crank shaft; a crank arm on said rotary contact member; and a crank pin therefor on the crank pin of the crank shaft.

13. In a motor car, the combination with the car body; of a traction wheel; an engine; a crank shaft adapted as an axle for said wheel having a crank disk thereon; a crank shaft casing having a bearing for said crank shaft thereon; a side plate for said casing; a timer comprising a contact carrying member adjustably mounted on the casing side plate in axial alinement with the crank shaft; a rotary contact member; a bearing therefor on said side plate, arranged in axial alinement with said crank shaft; a crank arm on said rotary contact member; and a crank pin therefor on the crank pin of the crank shaft.

14. The combination with an engine; of a crank shaft having a crank disk thereon; a crank shaft casing; a side plate for said casing; a timer comprising a cup-like contact carrying member adjustably mounted on the casing side plate in axial alinement with the crank shaft; a rotary contact member; a bearing therefor on said side plate, arranged in axial alinement with said crank shaft; a crank arm on said rotary contact member; and a crank pin therefor on the crank pin of the crank shaft.

15. In a motor car, the combination with the car body; of a traction wheel; an engine; a crank shaft adapted as an axle for said wheel; a crank shaft casing having a bearing for said crank shaft thereon; a side plate for said casing; a timer comprising a contact carrying member adjustably mounted on the casing side plate in axial alinement with the crank shaft; a rotary contact member; a bearing therefor on said side plate, arranged in axial alinement with said crank shaft; driving connections therefor to said crank shaft; and a flange-like guard on said side plate for said timer.

16. In a motor car, the combination with the car body, of a traction wheel; an engine; a crank shaft adapted as an axle for said wheel; a crank shaft casing having a bearing for said crank shaft thereon; a side plate for said casing; a timer comprising a contact carrying member adjustably mounted on the casing side plate in axial alinement with the crank shaft; a rotary contact member; a bearing therefor on said side plate, arranged in axial alinement with said crank shaft; and driving connections therefor to said crank shaft.

17. In a motor car, the combination with a frame, comprising longitudinal bottom sills arranged in a rearwardly inclined position, a traction wheel arranged at the front end of said frame, a pair of engines arranged below said bottom sills, a crank shaft for said engines adapted as an axle for said wheel and a crank shaft casing on which said sills and engines are mounted, provided with bearings for said crank shaft.

18. In a motor car, the combination with a car body, of a traction wheel, a pair of engines arranged one at each side of said wheel, and a yoke like connecting bracket for said engines arranged over said wheel.

19. In a motor car, the combination with a car body, a traction wheel, an axle, a pair of engines arranged one at each side of said wheel, and members on which said engines and car body are mounted provided with bearings for said axle.

20. In a motor car, the combination with a frame, a traction wheel, a pair of engines arranged below said frame one at each side of said wheel, an axle for said wheel adapted as a crank shaft for said engines, members on which said engine and frame are mounted provided with bearings for said axle and a connecting bracket for said engines constituting a member of the frame.

21. In a motor car, the combination with a frame, a traction wheel, a pair of engines arranged below said frame one at each side of said wheel, an axle for said wheel adapted as a crank shaft for said engines, and members on which said engines and frame are mounted provided with bearings for said axle.

22. In a motor car, the combination with a frame, a traction wheel, a pair of engines arranged below the side members of said frame, and a connecting bracket for said engines constituting a member of the frame.

23. In a motor car, the combination with a body, comprising longitudinal bottom sills, a traction wheel arranged between said sills, an axle therefor adapted as an engine crank shaft, members provided with bearings for said crank shaft secured to said sills, and engines arranged under said sills and secured to said members.

24. In a motor car, the combination with a frame, of a pair of engines arranged under said frame, a traction wheel, an axle therefor, adapted as a crank shaft for said engines, and a connecting bracket for said engines constituting a member of the frame.

25. In a motor car, the combination with a car body, of a traction wheel, a pair of engines, a common crank shaft for said engines, adapted as an axle for said wheel, members on which said body is mounted provided with bearings for said crank shaft, and a connecting bracket for said members.

26. In a motor car, the combination with a frame, of a traction wheel, an axle therefor, a pair of engines, driving connections to said engines and axle, and members provided with bearings for said axle, the engine cylinders and said frame being mounted on said members.

In witness whereof, we have hereunto set our hands and seals in the presence of two witnesses.

WILLIAM S. HOVEY. [L. S.]
CHARLES B. STEBBINS. [L. S.]
Witnesses:
ORLEY R. BAIRD,
ARTHUR P. COTTLE.